United States Patent
Garg et al.

(10) Patent No.: US 12,164,412 B2
(45) Date of Patent: Dec. 10, 2024

(54) SYSTEM AND METHOD FOR IDENTIFYING PERFORMANCE BOTTLENECKS

(71) Applicant: Microsoft Technology Licensing, LLC, Redmond, WA (US)

(72) Inventors: Spandan Garg, Calgary (CA); Roshanak Zilouchian Moghaddam, Kirkland, WA (US); Paul Sean Harrington, Seattle, WA (US); Chen Wu, Shanghai (CN); Neelakantan Sundaresan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 17/525,784

(22) Filed: Nov. 12, 2021

(65) Prior Publication Data

US 2023/0153226 A1     May 18, 2023

(51) Int. Cl.
*G06F 9/44* (2018.01)
*G06F 11/36* (2006.01)

(52) U.S. Cl.
CPC ...... *G06F 11/3612* (2013.01); *G06F 11/3636* (2013.01)

(58) Field of Classification Search
CPC .......... G06F 11/3612; G06F 11/3636
See application file for complete search history.

(56) References Cited

U.S. PATENT DOCUMENTS

| | | | |
|---|---|---|---|
| 2006/0288261 A1* | 12/2006 | Yuan ................... | G06F 11/0715 714/48 |
| 2007/0005297 A1* | 1/2007 | Beresniewicz .... | G05B 23/0235 702/181 |
| 2008/0244418 A1* | 10/2008 | Manolescu ........... | G06Q 10/00 715/753 |
| 2010/0180255 A1 | 7/2010 | Wen et al. | |
| 2015/0254163 A1* | 9/2015 | Baril ................... | G06F 11/3636 714/38.1 |
| 2015/0363294 A1* | 12/2015 | Carback, III ............ | G06F 8/70 717/132 |

(Continued)

OTHER PUBLICATIONS

Blumhardt, et al., "Serilog", [online]. [retrieved Dec. 1, 2021]. Retrieved from the Internet: <https://github.com/serilog/serilog>, Sep. 10, 2021, 5 Pages.

(Continued)

*Primary Examiner* — Hang Pan
(74) *Attorney, Agent, or Firm* — Schwegman Lundberg & Woessner, P.A.

(57) ABSTRACT

A computer implemented method includes accessing performance trace data for executed code of multiple services. Symbols corresponding to functions of the executed code are identified. First sequences of functions from the identified symbols are identified and a first performance threshold for each identified first sequence of functions is computed. The method includes receiving an incoming performance trace, detecting second sequences of functions from the incoming performance trace, identifying second sequences equivalent to the first sequences, and comparing performance of the identified second sequences to the first performance threshold for each of the equivalent first sequences to identify second sequences as comprising a performance bottleneck.

20 Claims, 11 Drawing Sheets

(56) References Cited

U.S. PATENT DOCUMENTS

| | | | |
|---|---|---|---|
| 2017/0257303 A1* | 9/2017 | Boyapalle | H04L 67/1001 |
| 2020/0272435 A1* | 8/2020 | Apte | G06F 40/20 |
| 2020/0293295 A1 | 9/2020 | Gao et al. | |

OTHER PUBLICATIONS

"Flame Graphs", [online]. [retrieved Dec. 2, 2021]. Retrieved from the Internet: <https://web.archive.org/web/20211124135800/https://www.brendangregg.com/flamegraphs.html>, Nov. 24, 2021, 14 Pages.

Luo, et al., "Mining Performance Regression Inducing Code Changes in Evolving Software", In Proceedings of IEEE/ACM 13th Working Conference on Mining Software Repositories, May 14, 2016, pp. 25-36.

"International Search Report Written Opinion Issued in PCT Patent Application No. PCT/US22/043561", Mailed Date : Dec. 23, 2022, 12 Pages.

\* cited by examiner

```
clr.dll!WKS::gc_heap::relocate_survivor
clr.dll!WKS::gc_heap::relocate_phase
clr.dll!WKS::gc_heap::plan_phase
clr.dll!WKS::gc_heap::gcX
clr.dll!WKS::gc_heap::garbage_collect
clr.dll!WKS::GCHeap::GarbageCollectGeneration
clr.dll!WKS::gc_heap::trigger_gc_for_alloc
clr.dll!FramedAllocateString
mscorlib.ni.dll!System.String.Concat
```
300

310

Benchmark Threshold: 3%

FIG. 3A

```
System.Core!System.Linq.enumerable.ToArray
mscorlib.ni.dll!System.String.Concat
```
305

310

Benchmark Threshold: 1%

FIG. 3B

```
using System;
using System.Collections;
using System.Collections.Generic;
using System.Globalization;
using System.IO;
using System.Reflection;
using System.Text;
using ChaCustom;
using Studio;
using Unity.Engine;
using Logger = BepInEx.Logger;

public class BoneController : MonoBehavior () {
/* edit */
public BoneModifierBody FindOrCreateModifierByBoneName(string boneName) {
    if (modifiers.ContainsKey(boneName))
        return modifiers[boneName];
    return InsertAdditionalModifier(boneName);
}
/* end */
public BoneModifierBody InsertAdditionalModifier(string boneName) {
    var BoneModifierBody = new BoneModifierBody(BoneModifierBody.ManualBoneId, null) { boneName = boneName };
    var loopGo = GetRootTransform().FindLoop(boneName);
    if (loopGo == null) {
        Logger.Log(LogLevel.Warning, $"[KKABMX] Manually included bone {boneName} was not found"); return null;
    }
    boneModifierBody.manualTarget = loopGo.transform;
    modifiers.Add(boneModifierBody.boneName, boneModifierBody);
    return boneModifierBody;
} private string GetLastLoadedFile();
public bool IsExtDataExists(string baseCharaFileName);
public string GetExtDataFilePath(string baseName);
public void LoadFromFile(string path);
public void DeleteFile();
public string Serialize();
void Update ();

public SortedDictionary<string, BoneModifierBody> modifiers = new SortedDictionary<string, BoneModifierBody>();
private const float MISSING_BONE_CHECK_INTERVAL = 1.5f;
private bool baseLineKnown; public ChaControl ChaControl;
public string fileToLoad; private bool isCustomScene;
private float missingBoneNextChecktime;
private float [] sibBodyValues;
private float [] sibFaceValues;

public class
{
    private B
    return
}
```

FIG. 8A

```
public class BoneController : MonoBehaviour private BoneModifierBody FindOrCreateModifierByBoneName(string boneName) {
    return modifiers.TryGetValue(boneName, out var result) ? result : InsertAdditionalModifier(boneName);
}
```

FIG. 8B

SYSTEM AND METHOD FOR IDENTIFYING PERFORMANCE BOTTLENECKS

BACKGROUND

Inefficient computer code can cause significant performance degradation and resource waste, referred to as performance bugs. Detecting and fixing performance bugs in a timely way is important for maintaining a good user experience, optimal throughput, and to reduce consumption of computational resources such as CPU and memory. Performance bugs are typically found with the help of a profiler, which records a trace of code that is executed to capture the runtime behavior of the code, such as an application. A developer must then manually go through these traces in search of performance issues and find portions of code responsible for the performance issues. This search can be time consuming in and of itself. In addition, the developer must then determine why the portions of code are causing the performance issue and then determine how to modify the code.

SUMMARY

A computer implemented method includes accessing performance trace data for executed code of multiple services. Symbols corresponding to functions of the executed code are identified. First sequences of functions from the identified symbols are identified and a first performance threshold for each identified first sequence of functions is computed. The method includes receiving an incoming performance trace, detecting second sequences of functions from the incoming performance trace, identifying second sequences equivalent to the first sequences, and comparing performance of the identified second sequences to the first performance threshold for each of the equivalent first sequences to identify second sequences as comprising a performance bottleneck.

BRIEF DESCRIPTION OF THE DRAWINGS

FIGS. 3A and 3B illustrate two common code sequences according to an example embodiment.

FIGS. 8A and 8B are examples of input-output pairs according to an example embodiment.

DETAILED DESCRIPTION

Figure 1:
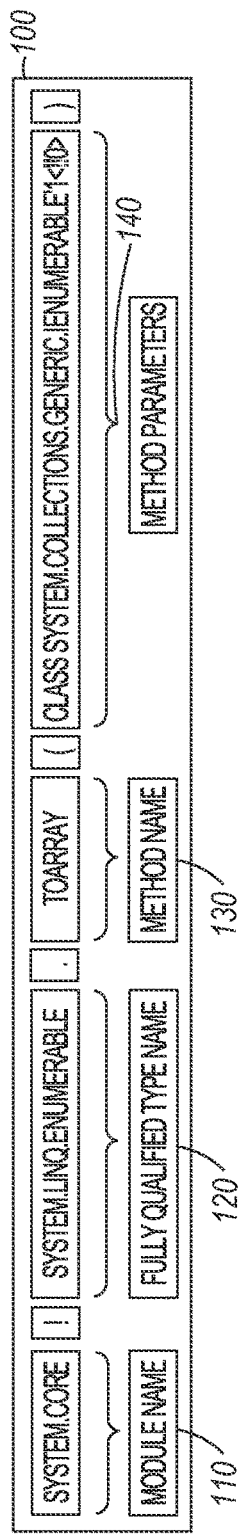
FIG. 1 is a representation of a symbol in a trace sampled by a profiler according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Computer software applications can include millions of lines of code. The development of such code can be an iterative process, with code being written and tested and then modified to determine performance issues. Performance issues may not surface until previously written code is combined with other code and then executed. The identification of performance issues can be tedious and time consuming, especially if done manually. While performance traces can aid in the identification of some performance issues, the review of such traces to identify code causing the performance issues can also be complex, error prone, and time consuming.

A bottleneck detection system utilizes traces from a profiler, such as a sampling-based profiler, to establish performance thresholds for various sequences of functions and a new application being executed. In a training phase, the system reviews traces from services being provided by existing programs to determine computing resources normally consumed by execution of sequences of functions of the existing programs. The performance thresholds are based on a selected high-end percentile of such executions. In one example, the percentile is between the $95^{th}$ and $99^{th}$ percentile. A selected standard deviation from the mean resource utilization may be used in further examples. A higher percentile will likely reveal more severe performance issues. Lowering the percentile may enable fine tuning of performance. Note that the percentile corresponds to the amount of computing resources used, which may mean that, for example, a sequence of functions may consume 3% of processing functions which may be in the $99^{th}$ percentile for services utilizing that sequence. The performance threshold may thus be set at 3%.

The performance thresholds are then compared to a review of a trace representative of resources consumed by sequences of functions of the new application that are executed to identify sequences of functions that are consuming more resources than they normally should. Such sequences of functions are identified as causing performance bottlenecks and are in need of modification.

The bottleneck detection system finds bottlenecks, allowing developers to focus on fixing bugs rather than having to sift through gigabytes of data manually. In one example, the bottlenecks are caused by user-written code. The bottleneck detection system may provide details on one or more function calls in the user-written code that are responsible for bottleneck. The details may include information identifying one or more of issue type, title, CPU usage, expected CPU usage, memory usage, expected memory usage, and other information helpful in identifying and fixing performance issues.

The profiler samples a processor stack to identify what code is running. In one example, the profiler is a sampling profiler that samples periodically, such as every 1 ms or other desired value that does not create a bottleneck itself.

The profiler may sample for a desired length of time to create a trace over that time that represents the stack. Traces recorded by TraceEvent library contain symbols with the following structure:

<Module>!<FullyQualifiedType>.<MethodName>
    (<Parameters>)

FIG. 1 is a representation of one symbol from the stack that is sampled by the profiler, referred to as a symbol 100. The symbol 100 includes for example: System.Core!System.Linq.Enumerable.ToArray(class System.Collections.Generic.IEnumerable'1<!!0>). System.core is a module name 110. System.Linq.Enumerable is a fully-qualified type name 120 that identifies a class within the module. ToArray is a method name 130, and class System.Collections.Generic.IEnumerable'1<!!0> are the method parameters 140. A symbol is generated for each module in the stack and the amount of time each module is in the stack may be calculated based on the number of samples in which such modules occur.

Traces may be collected from thousands of services provided by a set of servers and used to build a lookup table of frequently seen symbol modules.

Figure 2:
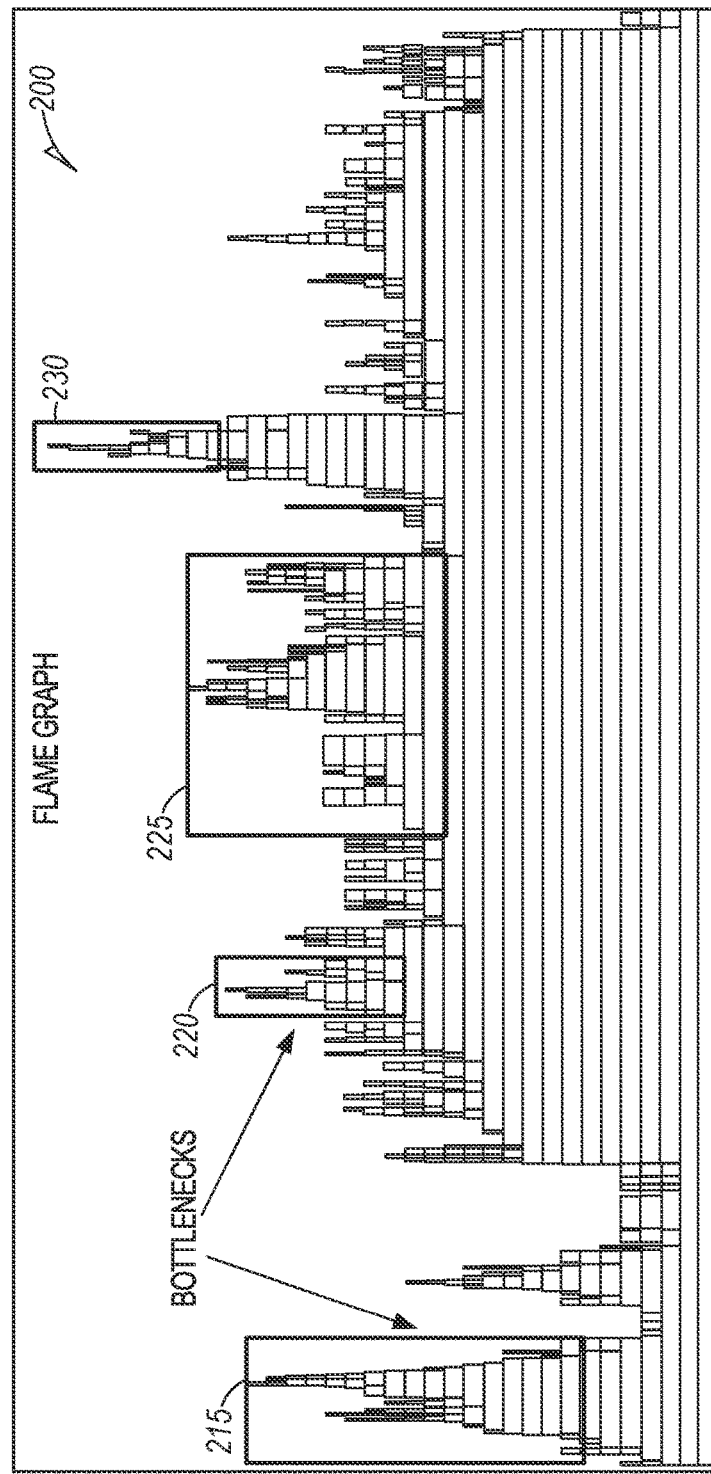
FIG. 2 is an example flamegraph representation of a trace according to an example embodiment.

FIG. 2 shows a flamegraph 200, which is a way of visualizing a trace produced by the sampling-based profiler, but is not actually used in detecting bottlenecks. The flamegraph contains multiple layers of bars, referred to as frames, which represent different functions that have been called and are in the CPU stack. A bottom frame 210 is an entry point into an application as it is the first function called when someone starts an application. Frame 210 is shown as being in the stack for the entire sampling period, such as 30 seconds or so. Paths of functions calls build upon the bottom frame 210, with each higher frame corresponding to a function called by the function corresponding to the frame immediately below. The lengths of frames in the stack of frames in the flamegraph 200 correspond to aggregated lengths of time that each function is open during the time covered by the trace.

The bottleneck detection system identifies performance bottlenecks, some of which may be represented by boxes 215, 220, 225, and 230 in the flamegraph 200. Each box corresponds to a function call made by a user that happens to be a performance bottleneck. The boxes in one example, only include calls from user code as opposed to calls from library code to focus on user written code bottlenecks. The bottleneck detection system will allow the user to focus solely on the bottlenecks identified rather than having to manually go through all the data collected by the profiler.

The traces may be used by the bottleneck detection system to build a lookup table of frequently seen symbol modules. In one example, the prefix of each symbol preceding the '!' i.e. the module name from all symbols found in these internal traces and create a list of common module names that appear across multiple services. This could indicate that this module name comes from a public library, since it is unlikely that user-written code from multiple services would share the same symbol. A list of modules names are collected that appear in more than one service, which come from various libraries .NET developers commonly use. This list of module names is later used to identify if a symbol in a user's trace corresponds to user-written code or a library method. Since these apps fall under a wide range of domains, the list is comprehensive enough to generalize to many users or customers.

Using the collected training trace data, thresholds at which the bottleneck detection system would flag a function's usage as a bottleneck are identified for users to consider optimizing.

Since there are too many unique functions/symbols in all the training data traces, library functions that may be private/only called internally within the library are filtered out. Otherwise, it would be too computationally expensive to process data for all the functions. Such filtering is performed by considering the number of unique modules of the immediate caller of a function in trace data. Looking at the set of modules the callers belong to, if more than a certain number of unique calling modules are found, the function is considered to be a customer-facing function i.e. a customer is able to call it from their self-written code. Otherwise, it is most likely an internal/private function called within the library and need not be further considered.

For example, if String.Concat internally calls String.ConcatInternal and String.ConcatInternal is never called directly by any user, no thresholds are computed for String.ConcatInternal. In this case, String.Concat is a customer-facing library function, while String.ConcatInternal is not.

All the paths through the traces (each trace is essentially a tree) are collected by the bottleneck detection system beginning with each of the customer-facing library functions all the way to the leaf node. Once the paths are collected for each function, the paths are mined for frequent sequences/n-grams through each function's set of paths that appear across multiple traces. Different sequences represent different use cases of these functions. For example, a String.Concat call that takes two Strings may have a different sequence of functions in the trace, than a String.Concat call that takes a List of Strings. Since these use cases may have different performance implications, it would make sense to compute a separate threshold for each.

FIGS. 3A and 3B illustrate two common sequences generally at 300 and 305. The sequences are read from the bottom up, beginning with String.Concat at 310. Respective thresholds are also shown at 315 and 320 as 3% and 1% respectively. These may be CPU utilization thresholds or memory utilization thresholds, as separate thresholds may be kept for each sequence. The sequences 300 and 305 represent different use cases of String.Concat. For example, sequence 300 shows an instance where String.Concat call triggers garbage collection. If garbage collection is triggered to often, for example, such that 3% or more of computing resources are consumed, the sequences is identified as a performance bottleneck.

Mining for frequent sequences within the paths of each function is now described in further detail. For all the paths corresponding to a function (e.g. String.Concat), all the n-grams rooted at the function with n ranging between 1 and k (inclusive), where k is the max pattern length, are computed. For each n-gram, the relative frequency of the n-gram is compared with its prefix n−1-gram (e.g. "AB" is the n−1-gram prefix of the n-gram "ABC") and if the n-gram is almost as frequent as the n−1-gram and has ahigh enough frequency, the n−1-gram is replaced with the n-gram in a running set of frequent sequences for this function. In one example, a maximum of n=5 may be used. Other values of n may be higher or lower in further examples and may be varied to optimize identification of common sequences.

For an incoming user/customer trace, symbols that begin with any of the prefixes present in the library prefix lookup table are filtered out. This leaves symbols/subtrees that are likely to correspond to client functions i.e. functions that the user/developer wrote. In various examples, the traces may cover a selected period of time, such as hour or several hours. Less than an hour's worth of trace data, such as five or ten minutes may be used in some examples to allow corrections of code in relatively real time.

Figure 4:
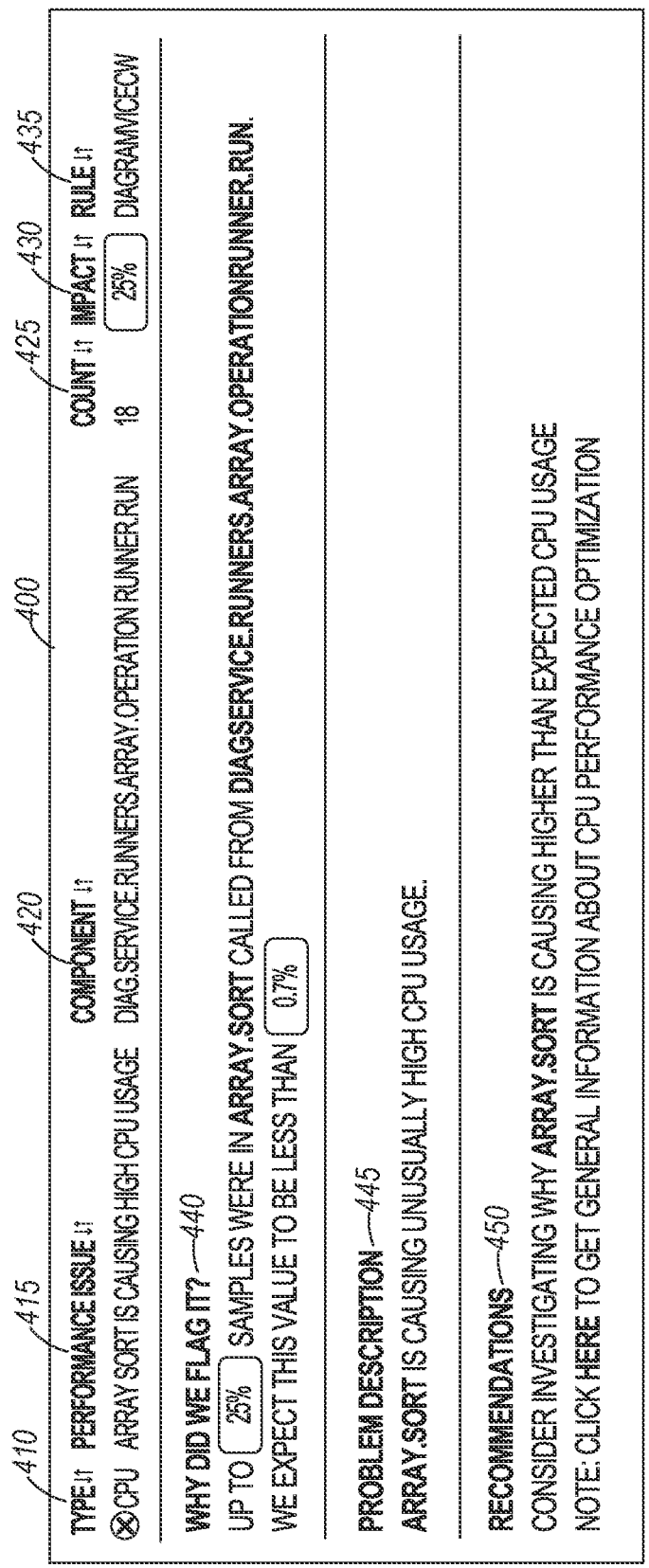
FIG. 4 is an example user interface for identifying code bottlenecks according to an example embodiment.

The system then determines if there are any performance bottlenecks in these subtrees. In each subtree, paths that have symbols matching one of the sequences in the benchmark value table are identified. The CPU/Memory usage of the root node of each sequence where the match begins is with the benchmark threshold for the matching sequence. If the CPU/Mem usage is higher than the threshold, the system considers this subtree a bottleneck, which is then displayed to the user through a user interface, such as shown in FIG. 4 at 400.

User interface 400 in one example describes a type of performance issue as CPU at 410 and a performance issue of "Array.Sort is causing high CPU usage" at 415. A component, "DiagService.Runners.ArrayOperationRunner.Run" is identified at 420. A count of "18" is shown at 425. An impact of 25% is shown at 430 and a role of diagservicecw is shown at 435. A reason the code was flagged is shown at 440: "Up to 25% CPU samples were in Array.Sort called from DiagSerice.Runners.ArrayOperationRunner.Run. We expect this value to be less than 0.7%." A problem description of "Array.Sort is causing unusually high CPU usage." is shown at 445, and Recommendations are shown at 450: "Consider investigating why Array.Sort is causing higher than expected CPU usage. NOTE: Click here to get general information about CPU performance optimization."

Metadata for the identified bottleneck may include the benchmark threshold value to let the user know how much the function could be optimized.

In one example, identified bottlenecks may be annotated with recommendations. From the common sequences found in the benchmark value computation step, a set of sequences has been identified that correspond to known performance issues in public repository such as .NET. As such, hardcoded recommendations may be provided that contain information such as ways of fixing the issue and links to helpful documentation pages for these sequences.

In order to identify these problematic sequences in an automated way, StackOverflow Questions, Github PRs/Issues, and internal perf-related emails have been collected and connected to the sequences by checking if they mention any of the functions from the list or in case of a PR, make changes to the usage of that function. The matched documents may be manually inspected and formulated these issues/recommendations based on discussions with a performance expert. Once the output of bottleneck detection is obtained, a check to see if any of the detected bottlenecks fall into the set of issues identified and the corresponding recommendation may be added to the output accordingly.

The result is a list of bottlenecks, some with and others without recommendations, which are then displayed to the customer using the UI shown at qqq00. The problematic sequences may be immediately fixed and uploaded such that the corresponding user code may continue to run with improved performance.

Figure 5:
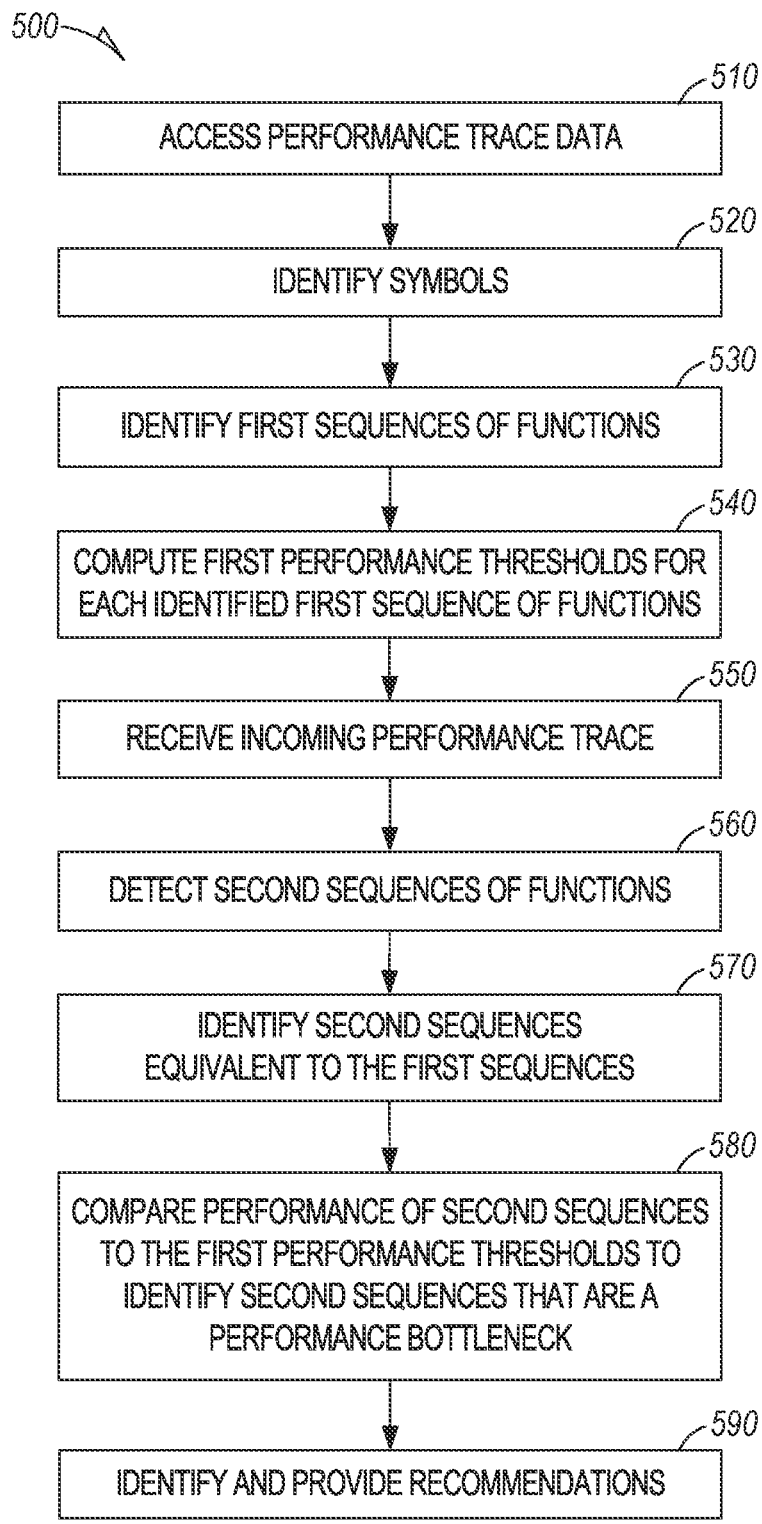
FIG. 5 is a flowchart illustrating a computer implemented method of identifying performance bottlenecks in code according to an example embodiment.

FIG. 5 is a flowchart illustrating a computer implemented method 500 of identifying performance bottlenecks in code, such as user generated application code. Method 500 begins at operation 510 by accessing performance trace data for executed code of multiple services. The performance traces may have been generated by sampling a CPU stack. Symbols corresponding to functions of the executed code are identified at operation 520. Each symbol may include a module name, a class, a method, and method parameters.

At operation 530, first sequences of functions are identified from the identified symbols. Identifying first sequences may be performed by identifying n-gram/sequences by comparing relative frequencies of an n-gram sequence with its n−1 gram sequence and keeping longer sequences having occurrences of similar or higher frequency.

A first performance threshold for each identified first sequence of functions is computed at operation 540. Identifying performance thresholds for first sequences may be based on computing resource usage of such sequences in the accessed performance trace data higher than a selected percentage for the multiple services. In one example, the selected percentage is between the 95$^{th}$ and 99$^{th}$ percentile. The first performance threshold may include separate first performance thresholds for memory usage and CPU usage. One or both of memory usage and CPU usage may be used to identify performance bottlenecks.

Once the first performance thresholds are computed based on the trace data for executed code of multiple services, such as from a company internal server farm or other entity having sufficient reference data to obtain a large number of traces, such as 1000 or more, an incoming performance trace from a particular application may be received at operation 550. Second sequences of functions from the incoming performance trace may be detected at operation 560 and compared at operation 570 to identifying second sequences equivalent to the first sequences. At operation 580 performance of the identified second sequences is compared to the first performance threshold for each of the equivalent first sequences to identify second sequences as comprising a performance bottleneck.

At operation 590, recommendations may be identified by comparing identified second sequences to prior identified sequence issues and corresponding recommendations for addressing the performance bottleneck. In one example, the recommendations may actually identify source code fixes by identifying code from one of the second sequences and providing the identified code to a model trained on training data comprising examples of previously fixed code. The model may identify code to fix the one of the second sequences.

Figure 6:
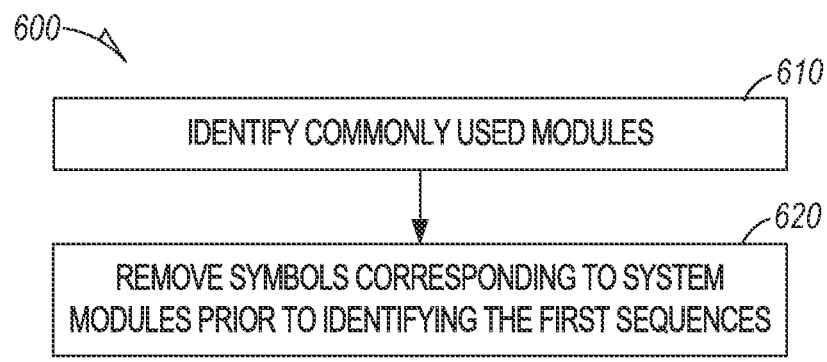
FIG. 6 is a flowchart illustrating a computer implemented method of reducing the number of symbols according to an example embodiment.

FIG. 6 is a flowchart illustrating a computer implemented method 600 of reducing the number of symbols. At operation 610, common module names across multiple service traces are identified to determine commonly used modules. At operation 620, symbols corresponding to system modules are removed prior to identifying the first sequences.

Once code that is associated with a performance bottleneck is identified, a language understanding transformer model may be used to identify code, referred to as a patch, to fix or correct the identified performance bottleneck code. The model may be trained on collected historical commit data from one or more same type of code repositories. The commit data includes original code and fixed code. The original code comprises training data samples, with the corresponding fixed code being the labels.

Figure 7:
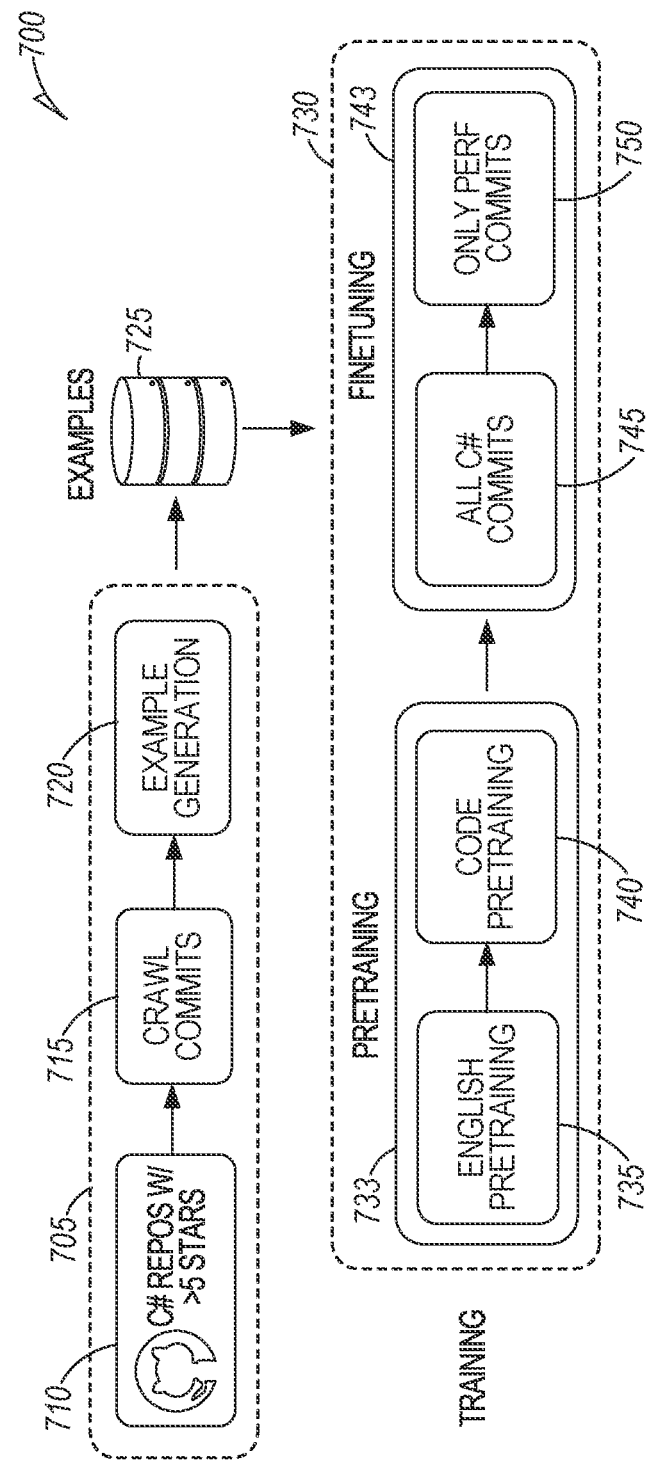
FIG. 7 is a block diagram illustrating a pipeline of model data collection and training according to an example embodiment.

FIG. 7 is a block diagram illustrating a pipeline 700 of model data collection and training. In one example, commit data is collected during a data collection stage 705 from a code repository 710 by crawling the repository for code commits at 715. The code repository, such as an open source repository on GitHub, may include multiple programs written in a selected programming language, such as C #for example. C #is used as an example for purposes of describing how to collect data and train a model during a training stage for providing in-code fixes for programs written in C #. Models for other programming languages may be created in a similar manner.

Crawling 715 may be configured to select software with more than a five-star count. The collected commit data is used for example generate 720 to provide examples 725 for each modified function. The examples 725 include contextual elements along with the modified function, referred to as a focal method.

The examples will be used during a training stage 730 to train a model 730. Model 730 may be a transformer model that has been pretrained 733 on English at 735 and source code in C #at 740. The model 730 is then fine-tuned at 743 by first training the model on all of the examples 725 at 745 and then further fine-tuning the model on a subset of the examples corresponding to performance related code modifications referred to as perf or performance commits at 750 to enhance identification of code fixes related to performance bottlenecks. Note that the model may also be used to generate code fixes in code not specifically related to performance bottlenecks in some examples such as to help debug an entire application program and possibly generate code fixes related to performance bottlenecks at the same time without having to first identify suspect code.

The data collection stage 705 is performed with a goal of generating examples 725 containing code changes made by C #developers to popular C #repos on GitHub. A repo's star count as a metric to determine if the code is popular. The commit history of a main branch of each program, also referred to as a project is crawled. Code changes made in C #files are parsed within each commit to identify modified methods and corresponding context to generate the examples 725.

Each project may be parsed using a tree-sitter parser. More specifically, the commit history is crawled in a main branch and each modified ".cs" (c #file extension) file is parsed within each commit. For each class contained within the file, class level contextual elements such as class and method names, bodies, signatures, variables are collected. The corresponding class's method bodies before and after the change are compared to see which ones have been modified.

For every class in the before-commit version of a file, the corresponding after-commit version of that class is found. To determine which methods have been modified in the class, the methods from the before class are mapped to the methods in after change class. The following heuristic is used. A class is considered a method in the after class, a modified version of a class method in before class if:

1. They have the same method name and there's only one method by that name in the class, or 2. They have the same method name and same input parameter types, in case there are multiple overloads with that name.

In the latter case number 2, only parameter types are checked because the developer may have updated the variable names as part of the change, even though it is still the same method. Methods are filtered out so that only the methods that have been modified by comparing the bodies of the before and after method are included. To avoid any trivial edits, the before and after bodies of the methods are normalized by removing trailing and standardizing whitespace, stripping comments, and then comparing the bodies of these normalized methods.

For each modified method a.k.a. focal method identified, an input-output pair is generated. The pair incorporates various class/file level contextual elements as shown in an example 800 of an input-output pair in FIGS. 8A and 8B. The following contextual elements in this order priority (high to low):
1. Focal method at 810
2. Class Signature at 820
3. Caller/Callee methods at 830
4. Import Statements at 840
5. Class Attributes at 850
6. Method signatures at 860

In one example, the order of priority of these different contextual elements is determined by an estimate of an order in which C #developers consider while trying to fix code.

While generating the examples, the code is tokenized using byte-pair encoding (BPE), including as much information from the context elements as possible in accordance with the element priority within the limited input context size of 1024 tokens. The intuition behind including more context is that the context provides the model with greater information to allow it to attend to the relevant tokens of the input, when generating the fix.

The example 800 of the Input-output pair used in training is labeled with the contextual elements as listed above. As part of the input, along with the focal method 810, various class/file level context elements are included, such as import statements 840, class signature 820, caller/callee methods 830, method signatures 860, class-level attributes 850, as shown in FIG. 8A. Comments such as "/*edit*/", "/*end*/" may be added before and after the focal method 810 indicating its location to the model. The output consists of the focal method 880 with modifications indicated at 890 in FIG. 8B.

The output of the model is simply the modified focal method 880 along with other changes, such as any additional import statements that may have been added, class-level attributes used in focal method that are modified by the commit, and changes made to caller/callee methods. The changes may be determined using the same process used to determine modified focal methods in a commit.

In one example, a 406 M-parameter BART transformer model is used for the model. The model is a denoising autoencoder, which uses a standard sequence-to-sequence transformer architecture, with the main difference being that it replaces the ReLU (Rectified Linear Unit) activation functions with GeLUs (Gaussian Error Linear Units) activation functions.

The model may be warm-started from Facebook's English pretrained checkpoint and then further pretrained using span-masking denoising objectives on corrupted C #source code taken from 26 k C #repos. Denoising is performed by simply corrupting the code using a noising function to mask out spans of tokens in the original code. The model then retrieves the uncorrupted version.

In the pre-training stage 733 the model (that is already pretrained on English) is pretrained on source code written in C #. Popular code corpus may be collected from one or more public C #repositories. The collected code may have 50 stars or other measurable level of desired popularity. The collected code may be deduplicated on a file level using a hash function. The generation of a hash on code makes it easier to identified identical code by comparing hashes and remove additional copies of code that have the same generated hash values. This leaves, in one example, 27 GB of training data from 26,000 repositories that may be used to pretrain the model. In one example, the model may be trained for three weeks on sixteen 32 GB Tesla V100 GPUs for 73 epochs.

The finetuning stage 743 may include first splitting the data from the example generation step into train, test and validation sets to make sure there is no data leakage across the steps. Table 1 and Table 2 show the number of repositories and examples, respectively, in the train, test and validation sets for two finetuning steps in one example.

TABLE 1

Number of repos in train, test and validation sets for the finetuning steps:

| Step | Train | Valid | Test |
|---|---|---|---|
| All Commits | 45k | 1.5k | — |
| Perf Commits | 45k | 0.6k | 0.6 |

TABLE 2

Number of examples in train, test and validation sets for the finetuning steps:

| Step | Train | Valid | Test |
|---|---|---|---|
| All Commits | 16M | 262k | — |
| Perf Commits | 2.5M | 51k | 25k |

The model is further finetuned at 750 on the task of generating performance fixes for a given focal method that is performance related.

More formally, given a training dataset, where X={x1, ..., xm} are the set of inputs containing the focal methods, Y={y1, ... ym} be the corresponding output focal methods (along with changes to other fields) and each yi=yi,1, ... yi,n, with n being the length of the output yi. A training objective is used to learn the model parameters θ that maximize the sum of the log of the probabilities using the following log likelihood, L:

$$L_{finetune} = L(\theta, (X, Y)) = \sum_{(x_i, y_i)}^{(X,Y)} \log \prod_{t=1}^{n} P(y_{i,t} | y_{i,<t}, x_i; \theta)$$

The expression after the log represents a product of probabilities of the tokens being generated for example i. 't' is the index of the token being generated and goes from 1 to 'n'. 'n' is the number of tokens in the output sequence $y_i$. Using the above objective, finetuning 743 may be performed using a two-step finetuning process:

All commits finetuning 745 is performed by finetuning the model on all the commit data, effectively teaching the model how C #developers make changes.

Performance commits finetuning 750 is performed by finetuning the model on only the examples extracted from performance commits, teaching it how to make performance changes. In order to determine if a commit is a performance related commit, its description may be checked to see if the description contains keywords such as "perf", "performance", "optimize", "allocations", "slow", etc.

During training, the cross-entropy loss over the step's corresponding validation set is monitored. Separate validation sets (from a distinct set of repos) may be used for the two finetuning steps such that none of the validation sets overlap with any of the training sets in either step. Near duplicates of examples may also be removed in either or both training sets from all the test and validation sets. This is done so that the model converges to a minimum depending on the loss achieved on previously unseen data in each step and that the final test set used to evaluate the model is also unbiased. Near duplicate removal may be based on Jaccard similarity of their tokens based on a desired threshold of similarity.

Figure 9:
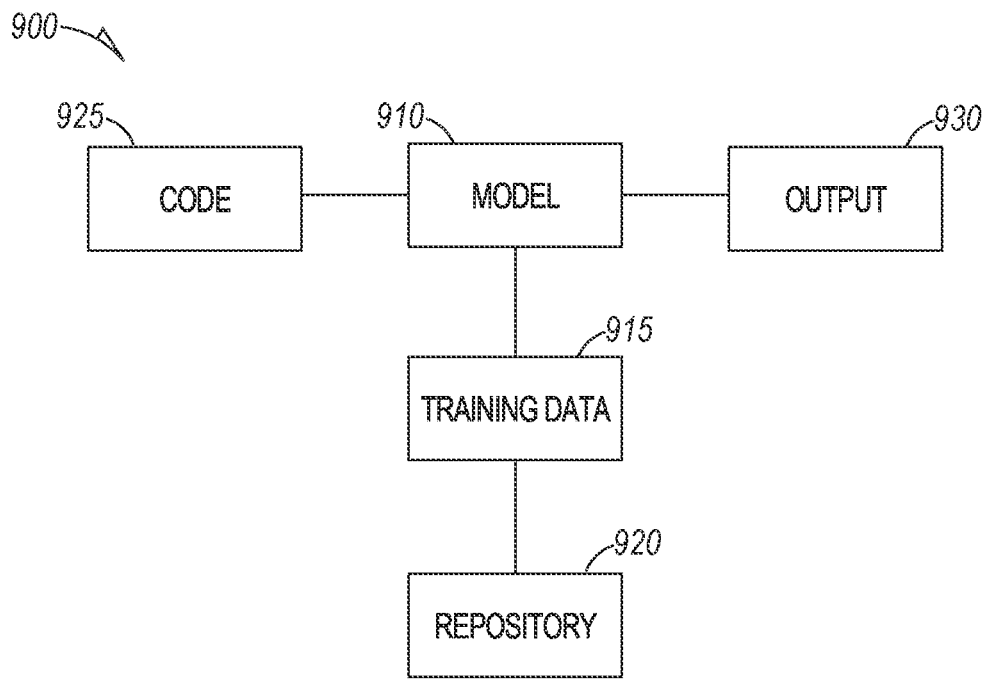
FIG. 9 is a block diagram illustrating a system for identifying code fixes according to an example embodiment.

FIG. 9 is a block diagram illustrating a system 900 for identifying code fixes. System 900 includes a model 910 as previously described that is trained on training data 915 obtained by crawling one or more code repositories 920. Input code 925 is tokenized and provided to the model 910, which generates an output 930 comprising a code fix for the input code. The input code 925 may include the same contextual information that is extracted and tokenized in the same manner as the training data 915 examples.

Figure 10:
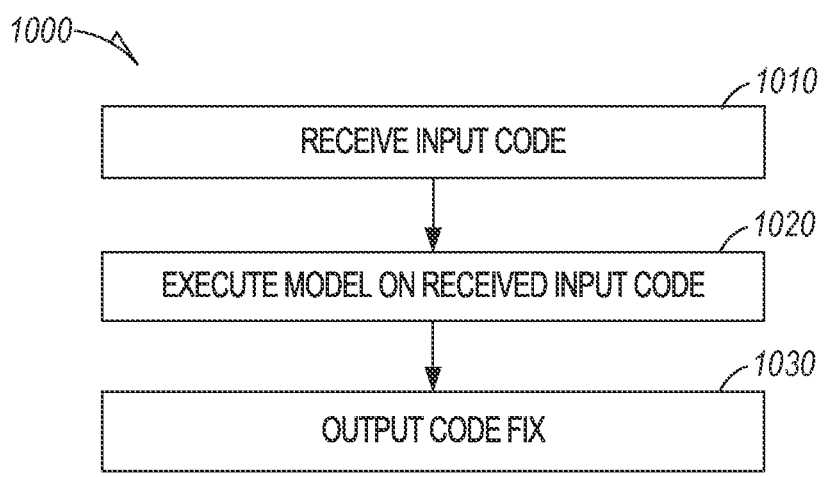
FIG. 10 is a flowchart illustrating a computer implemented method for identifying code fixes according to an example embodiment.

FIG. 10 is a flowchart illustrating a computer implemented method 1000 for identifying code fixes. Method 1000 begins at operation 1010 by receiving input code written in a first computer programming language. At operation 1020, the model 910 is executed on the input code. The model 910 has been trained on training data comprising original code samples in the first computer programming language with labels comprising fixed code obtained commit data for code written in the first programming language. The commit data includes for each commit, the original code and fixed code.

Each training data original code sample comprises a focal method that has been modified and one or more additional prioritized contextual elements that are tokenized. The one or more additional prioritized contextual elements comprise a class signature, caller/callee methods, import statements, class attributes, and method signature. The original code samples may be tokenized using byte-pair encoding.

At operation 930, the model 910 outputs a code fix for the input code. The code fix is essentially the fixed code corresponding to the identified original code sample.

Figure 11:
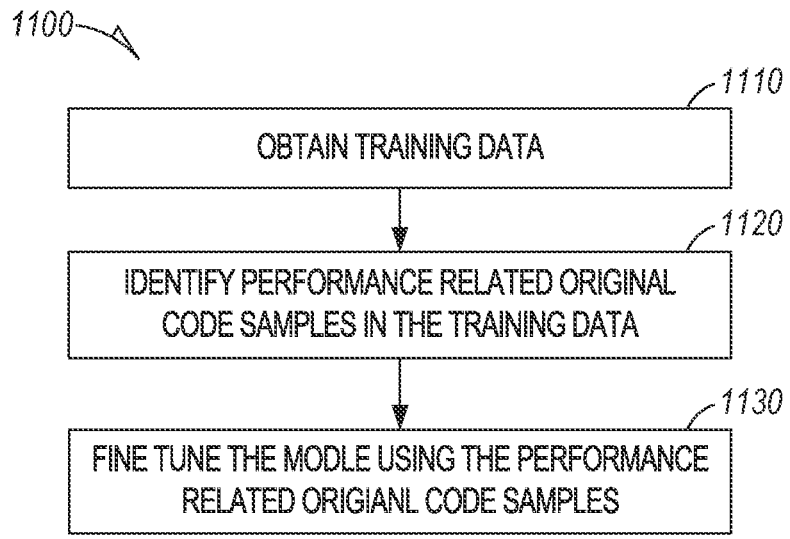
FIG. 11 is a flowchart illustrating a computer implemented method for generating training data and further training model according to an example embodiment.

FIG. 11 is a flowchart illustrating a computer implemented method 1100 for generating the training data and further training the model 910. At operation 1110, the training data is obtained by crawling commits to code repositories. The model 910 is further trained at operation 1120 by identifying performance related original code samples in the training data. Using the performance related original code samples, operation 1130 finetunes the model.

The performance related original code samples are identified by searching the commits for references to performance related words.

Figure 12:
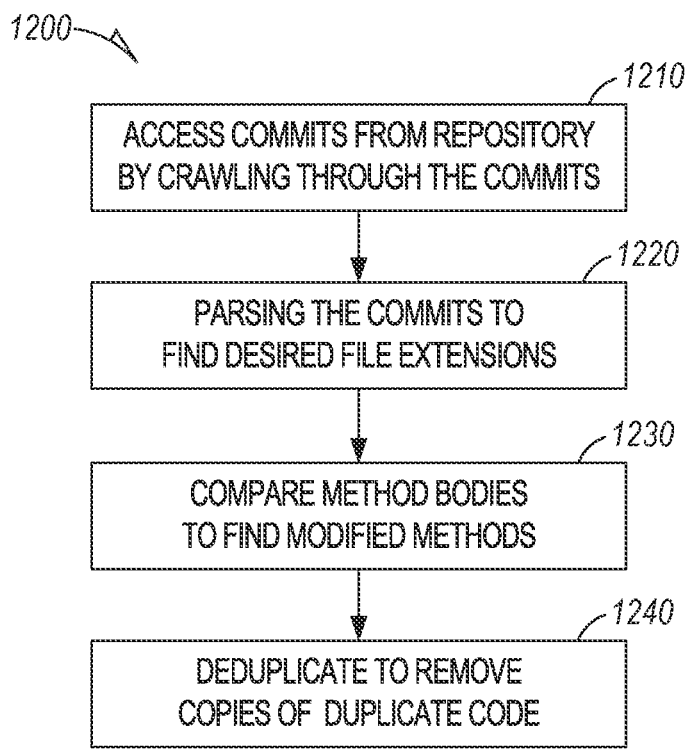
FIG. 12 is a flowchart illustrating a computer implemented method for identifying methods which have been modified according to an example embodiment.

FIG. 12 is a flowchart illustrating a computer implemented method 1200 for identifying methods which have been modified. The training data is obtained from commits to code repositories that are accessed at operation by crawling at operation 1210 and parsing at operation 1220 the code repositories to find files having file extensions corresponding to the first programming language. At operation 1230, method bodies in the original code samples and corresponding fixed code are compared to determine which methods have been modified. At operation 1240, the files may be deduplicated to remove copies of duplicate or near duplicate code.

In one example, the model 910 is a pretrained and denoised autoencoder pretrained on English and first programming language code and denoised on corrupted first programming language code.

The input code may be code that has been identified as performance bottleneck code and tokenized. In this case, operation 930 provides code fix that enhances performance. In a further example, the input code may include portions of code from an entire application program that has been identified and tokenized. Many functions in the application program may be improved by utilizing the fixes output in response to such input.

Figure 13:
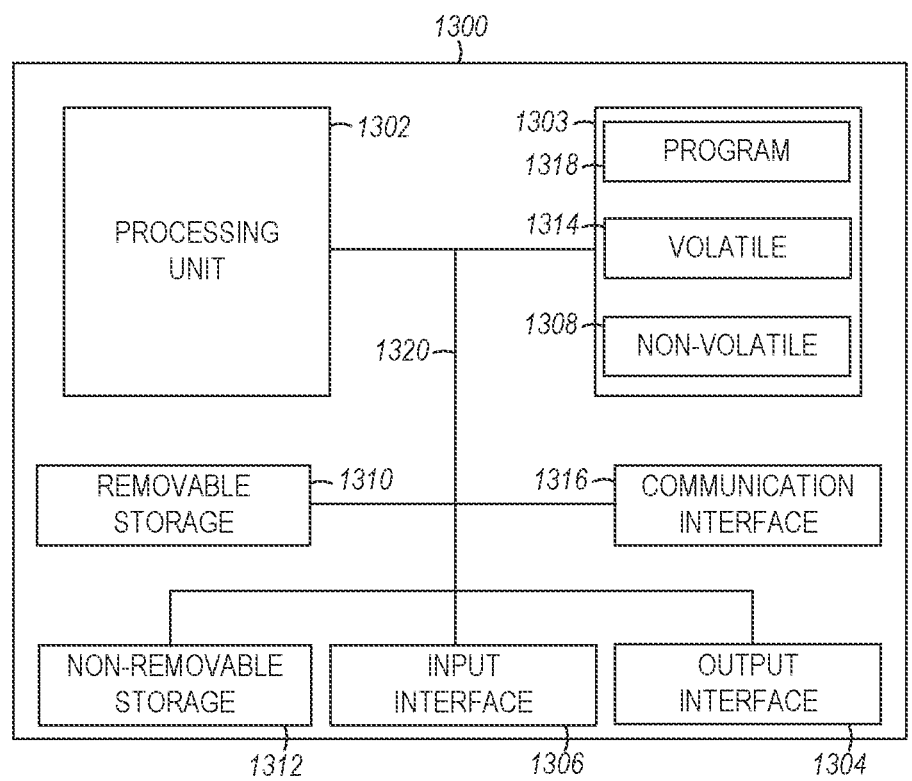
FIG. 13 is a block schematic diagram of a computer system to implement one or more example embodiments.

FIG. 13 is a block schematic diagram of a computer system 1300 to identify code bottlenecks and optionally identify recommendations such as code fixes and for performing methods and algorithms according to example embodiments. All components need not be used in various embodiments.

One example computing device in the form of a computer 1300 may include a processing unit 1302, memory 1303, removable storage 1310, and non-removable storage 1312. Although the example computing device is illustrated and described as computer 1300, the computing device may be in different forms in different embodiments. For example, the computing device may instead be a smartphone, a tablet, smartwatch, smart storage device (SSD), or other computing device including the same or similar elements as illustrated and described with regard to FIG. 13. Devices, such as smartphones, tablets, and smartwatches, are generally collectively referred to as mobile devices or user equipment.

Although the various data storage elements are illustrated as part of the computer 1300, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1303 may include volatile memory 1314 and non-volatile memory 1308. Computer 1300 may include—or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1300 may include or have access to a computing environment that includes input interface 1306, output interface 1304, and a communication interface 1316. Output interface 1304 may include a display device, such as a touchscreen, that also may serve as an input device. The input interface 1306 may include one or more of a touchscreen, touchpad, mouse, keyboard, camera, one or more device-specific buttons, one or more sensors integrated within or coupled via wired or wireless data connections to the computer 1300, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1300 are connected with a system bus 1320.

Computer-readable instructions stored on a computer-readable medium are executable by the processing unit 1302 of the computer 1300, such as a program 1318. The program 1318 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1318 along with the workspace manager 1322 may be used to cause processing unit 1302 to perform one or more methods or algorithms described herein.

Performance Bottleneck Code Identification Examples:

1. A computer implemented method includes accessing performance trace data for executed code of multiple services. Symbols corresponding to functions of the executed code are identified. First sequences of functions from the identified symbols are identified and a first performance threshold for each identified first sequence of functions is computed. The method includes receiving an incoming performance trace, detecting second sequences of functions from the incoming performance trace, identifying second sequences equivalent to the first sequences, and comparing performance of the identified second sequences to the first performance threshold for each of the equivalent first sequences to identify second sequences as comprising a performance bottleneck.

2. The method of example 1 and further including identifying recommendations by comparing identified second sequences to prior identified sequence issues and corresponding recommendations for addressing the performance bottleneck.

3. The method of any of examples 1-2 and further including identifying source code fixes by identifying code from one of the second sequences, providing the identified code to a model trained on training data comprising examples of previously fixed code, and receiving code to fix the one of the second sequences.

4. The method of any of examples 1-3 wherein the performance traces are generated by sampling a CPU stack.

5. The method of any of examples 1-4 wherein each symbol includes a module name, a class, a method, and method parameters.

6. The method of any of examples 1-5 and further including identifying common module names across multiple service traces to identify commonly used modules and removing symbols corresponding to system modules prior to identifying the first sequences.

7. The method of any of examples 1-6 wherein identifying first sequences includes identifying n-gram/sequences by comparing relative frequencies of an n-gram sequence with its n−1 gram sequence and keeping longer sequences having occurrences of similar or higher frequency.

8. The method of any of examples 1-7 wherein identifying performance thresholds for first sequences is based on computing resource usage of such sequences in the accessed performance trace data higher than a selected percentage for the multiple services.

9. The method of example 8 wherein the selected percentage is between the $95^{th}$ and $99^{th}$ percentile.

10. The method of any of examples 1-9 wherein the first performance threshold includes separate first performance thresholds for memory usage and CPU usage.

11. A machine-readable storage device has instructions for execution by a processor of a machine to cause the processor to perform operations to perform any of the above performance bottleneck code identification examples.

12. A device includes a processor and a memory device coupled to the processor and having a program stored thereon for execution by the processor to perform operations to perform any of the above performance bottleneck code identification examples.

Code Patch Identification Examples:

13. A computer implemented method includes receiving input code written in a first computer programming language, executing a trained model on the input code, wherein the model has been trained on training data comprising original code samples in the first computer programming language with labels comprising fixed code obtained commit data for code written in the first programming language, the commit data including for each commit, the original code and fixed code, and outputting a code fix for the input code.

14. The method of example 13 wherein the training data is obtained from commits to code repositories and wherein the model is further trained by identifying performance related original code samples in the training data and fine-tune training the model based on the identified performance related code samples.

15. The method of example 14 wherein performance related original code samples are identified by searching the commits for references to performance related words.

16. The method of any of examples 13-15 wherein the training data is obtained from commits to code repositories that are accessed by crawling and parsing the code repositories to find files having file extensions corresponding to the first programming language and by comparing method bodies in the files to determine which methods have been modified.

17. The method of example 12 and further comprising depulicating the files to remove files with duplicate code.

18. The method of any of examples 13-15 wherein a training data original code sample includes a focal method that has been modified and one or more additional prioritized contextual elements that are tokenized.

19. The method of example 18 wherein the one or more additional prioritized contextual elements comprise a class signature, caller/callee methods, import statements, class attributes, and method signature.

20. The method of any of examples 18-19 wherein original code samples are tokenized using byte-pair encoding.

21. The method of any of examples 13-20 wherein the model includes a pretrained and denoised autoencoder pretrained on English and first programming language code and denoised on corrupted first programming language code.

22. The method of any of examples 13-21 wherein the input code includes code identified as performance bottleneck code.

23. The method of any of examples 13-22 wherein the input code includes code from an application program.

24. A machine-readable storage device having instructions for execution by a processor of a machine to cause the processor to perform operations to perform any of the above code patch identification examples.

25. A device includes a processor and a memory device coupled to the processor and having a program stored thereon for execution by the processor to perform operations to perform any of the above code patch identification examples.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
accessing performance trace data for executed code of existing programs, from an open source code repository, written by many users over multiple domains;
identifying symbols corresponding to functions of the executed code;
identifying first sequences of functions from the identified symbols;
computing a first performance threshold for each identified first sequence of functions, the first performance threshold based on first sequences consuming more resources than normal;
receiving an incoming performance trace from execution of current code of a new application being developed that is different from the existing programs;
detecting second sequences of functions from the incoming performance trace;
identifying second sequences equivalent to the first sequences;
comparing performance of the identified second sequences to the first performance threshold for each of the equivalent first sequences to identify second sequences as comprising a performance bottleneck;
identifying code from one of the second sequences;
providing the identified code to a model trained on training data comprising examples of existing program code, existing program contextual elements, and a label comprising a corresponding fix; and
receiving code from the model to fix the one of the second sequences.

2. The method of claim 1 and further comprising identifying recommendations by comparing identified second sequences to prior identified sequence issues and corresponding recommendations for addressing the performance bottleneck.

3. The method of claim 1 wherein the model comprises a language understanding transformer model.

4. The method of claim 1 wherein the performance traces are generated by sampling a CPU stack.

5. The method of claim 1 wherein each symbol includes a module name, a class, a method, and method parameters.

6. The method of claim 1 and further comprising:
identifying common module names across the existing programs traces to identify commonly used modules; and
removing symbols corresponding to system modules prior to identifying the first sequences.

7. The method of claim 1 wherein identifying first sequences comprises identifying n-gram/sequences by comparing relative frequencies of an n-gram sequence with its n−1 gram sequence and keeping longer sequences having occurrences of similar or higher frequency.

8. The method of claim 1 wherein identifying performance thresholds for first sequences is based on computing resource usage of such sequences in the accessed performance trace data higher than a selected percentage for the existing programs.

9. The method of claim 8 wherein the selected percentage is between the $95^{th}$ and $99^{th}$ percentile.

10. The method of claim 1 wherein the first performance threshold comprises separate first performance thresholds for memory usage and CPU usage.

11. A machine-readable storage device having instructions for execution by a processor of a machine to cause the processor to perform operations to perform a method, the operations comprising:
accessing performance trace data for executed code of existing programs, from an open source code repository, written by many users over multiple domains;
identifying symbols corresponding to functions of the executed code;
identifying first sequences of functions from the identified symbols;
computing a first performance threshold for each identified first sequence of functions, the first performance threshold based on first sequences consuming more resources than normal;
receiving an incoming performance trace from execution of current code of a new application being developed that is different from the existing programs;
detecting second sequences of functions from the incoming performance trace;
identifying second sequences equivalent to the first sequences;
comparing performance of the identified second sequences to the first performance threshold for each of the equivalent first sequences to identify second sequences as comprising a performance bottleneck;
identifying code from one of the second sequences;
providing the identified code to a model trained on training data comprising examples of existing program code, existing program contextual elements, and a label comprising a corresponding fix; and
receiving code from the model to fix the one of the second sequences.

12. The device of claim 11 wherein the operations further comprise identifying recommendations by comparing identified second sequences to prior identified sequence issues and corresponding recommendations for addressing the performance bottleneck.

13. The device of claim 11 wherein the model comprises a language understanding transformer model.

14. The device of claim 11 wherein the performance traces are generated by sampling a CPU stack, wherein each symbol includes a module name, a class, a method, and method parameters, and wherein the first performance threshold comprises separate first performance thresholds for memory usage and CPU usage.

15. The device of claim 11 wherein the operations further comprise:
identifying common module names across existing programs traces to identify commonly used modules; and
removing symbols corresponding to system modules prior to identifying the first sequences.

16. The device of claim 11 wherein identifying first sequences comprises identifying n-gram/sequences by comparing relative frequencies of an n-gram sequence with its n−1 gram sequence and keeping longer sequences having occurrences of similar or higher frequency.

17. The method of claim 11 wherein identifying performance thresholds for first sequences is based on computing resource usage of such sequences in the accessed performance trace data higher than a selected percentage for the existing programs.

18. A device comprising:
a processor; and
a memory device coupled to the processor and having a program stored thereon for execution by the processor to perform operations comprising:

accessing performance trace data for executed code of existing programs, from an open source code repository, written by many users over multiple domains;

identifying symbols corresponding to functions of the executed code;

identifying first sequences of functions from the identified symbols;

computing a first performance threshold for each identified first sequence of functions, the first performance threshold based on first sequences consuming more resources than normal;

receiving an incoming performance trace from execution of current code of a new application being developed that is different from the existing programs;

detecting second sequences of functions from the incoming performance trace;

identifying second sequences equivalent to the first sequences;

comparing performance of the identified second sequences to the first performance threshold for each of the equivalent first sequences to identify second sequences as comprising a performance bottleneck;

identifying code from one of the second sequences;

providing the identified code to a model trained on training data comprising examples of existing program code, existing program contextual elements, and a label comprising a corresponding fix; and receiving code from the model to fix the one of the second sequences.

19. The device of claim 18 wherein the operations further comprise identifying recommendations by comparing identified second sequences to prior identified sequence issues and corresponding recommendations for addressing the performance bottleneck.

20. The device of claim 18 wherein the performance traces are generated by sampling a CPU stack, wherein each symbol includes a module name, a class, a method, and method parameters.

* * * * *